UNITED STATES PATENT OFFICE.

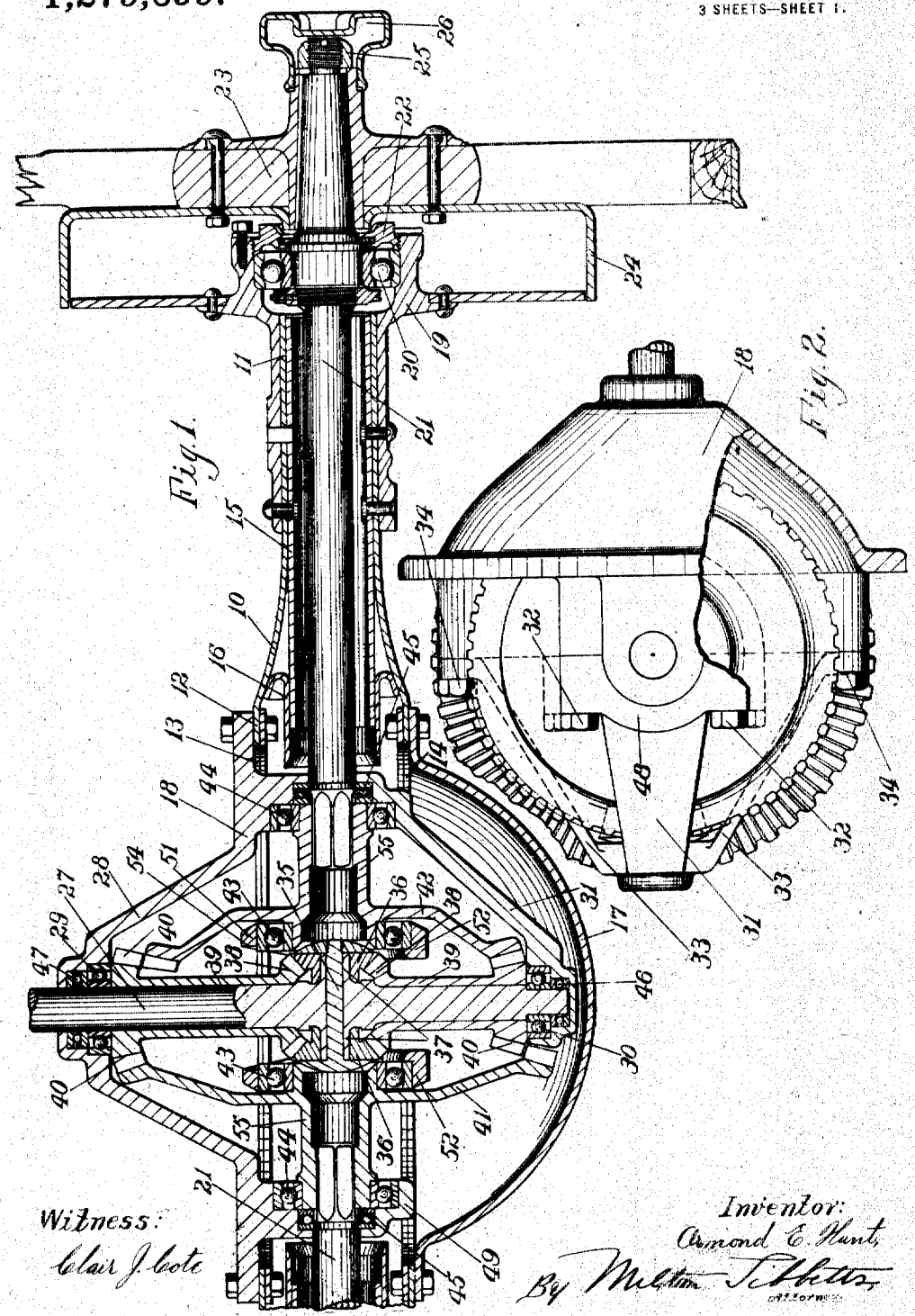

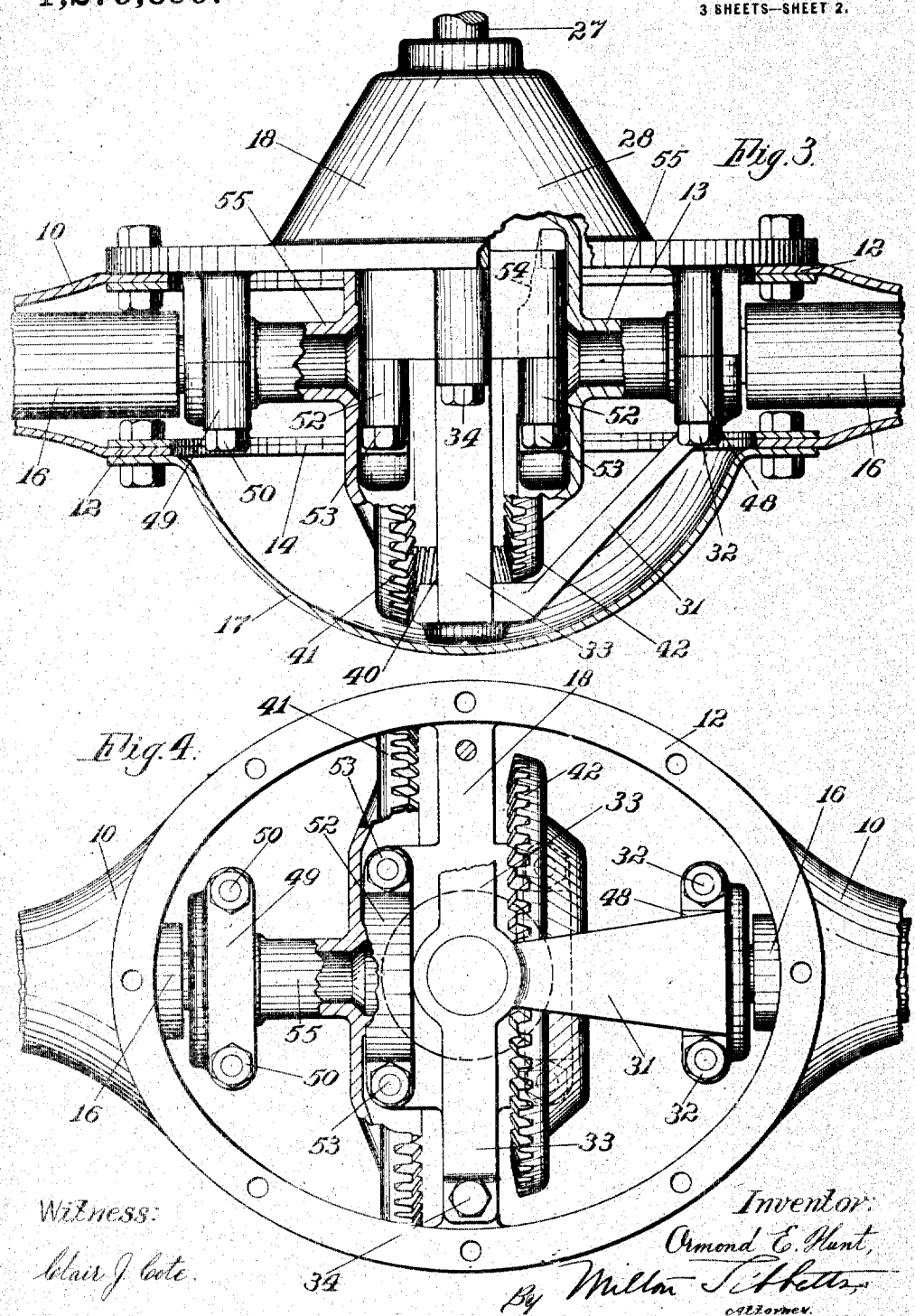

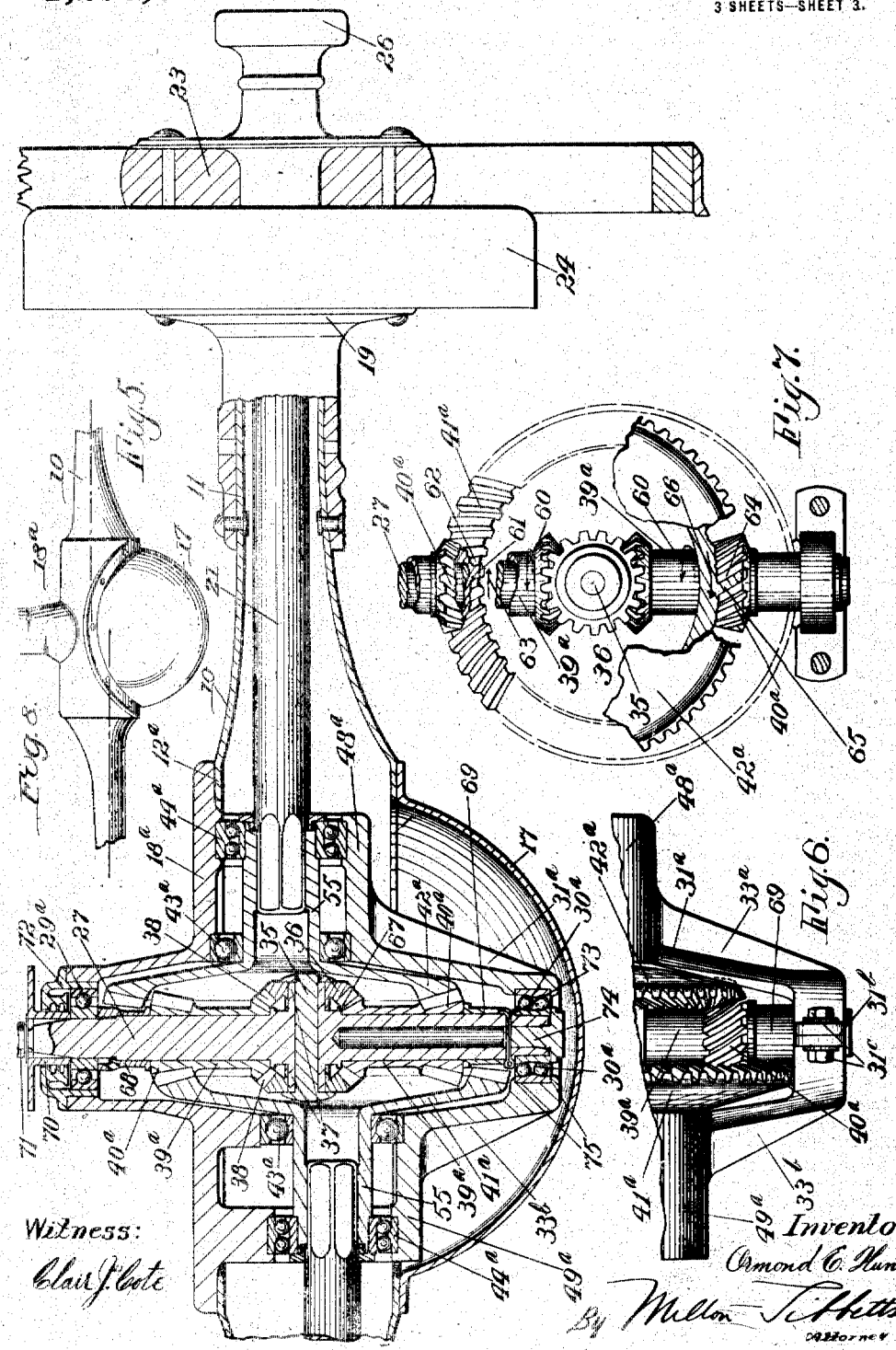

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,279,699.  Specification of Letters Patent.  Patented Sept. 24, 1918.

Application filed December 1, 1915. Serial No. 64,491.

*To all whom it may concern:*

Be it known that I, ORMOND E. HUNT, a citizen of the United States, and resident of Detroit, Wayne county, State of Michigan, have invented certain new and useful Improvements in Motor-Vehicles, of which the following is a specification.

This invention relates to motor vehicles and particularly to driving axles therefor. More especially, the invention relates to that form of driving axle in which the differential is arranged transversely of the axle shaft. Some of the features of the invention, however, are not necessarily limited to such form of axle, but may be used in axles of other types.

One of the objects of the invention is to produce an axle of the above referred to type in which all of the gears are mounted in bearings in a single supporting member.

Another object of the invention is to produce an axle of the above form, in which the axle shafts may be axially withdrawn and disconnected from the center gearing, and such gearing laterally assembled in the axle and disassembled therefrom.

Another object of the invention is to provide novel combinations of different types of bevel gears, particularly in axles of the above referred to type.

Another object of the invention is to provide, in an axle of the above referred to type, separated bearings for each of the large bevel gears mounted at the middle portion of the axle.

Other objects of the invention will appear from the following description taken in connection with the drawings, which form a part of this specification, and in which—

Figure 1 is a horizontal longitudinal section through a vehicle axle embodying this invention;

Fig. 2 is an end view of the gear supporting member removed from the axle casing;

Fig. 3 is a slightly enlarged view similar to Fig. 1 except that certain of the parts are in plan instead of in section;

Fig. 4 is a rear view of the axle shown in Fig. 3, with the rear cover removed, and with certain parts cut away to more clearly illustrate the construction;

Fig. 5 is a view similar to Fig. 1, showing another form of the invention;

Fig. 6 is a fragmentary plan view of part of the gear supporting member and of the gears;

Fig. 7 is a transverse view showing the differential gears and one of the large driving gears; and Fig. 8 is a plan view of this type of axle.

Referring to the drawings, 10 represents the main supporting structure or tubular casing of the axle. It has tubular end portions 11 and an enlarged middle portion 12, the latter portion having a lateral opening 13 on the front side and an alined opening 14 on the rear side of the axle. The tubular portions have reinforcing members 15, the inner ends of which are connected to the tapered casing by flanged sleeves 16. The rear opening 14 is closed by a suitable detachable cover 17. The front opening 13 in the axle is closed by a detachable cover 18, which also forms the gear-supporting member as will be hereinafter described.

The outer end of the axle and the wheel may be of any suitable form. As shown, a suitable bearing support 19 is sleeved upon and riveted to the outer end of the tubular part of the axle casing, and the bearings 20 in said member support the outer end of the axle shafts 21, there being two of these shafts, one for each end of the axle casing, as will be understood. The bearing 20 is retained in position by a collar 22 screwed into the end of the member 19, and thus retains the axle shafts 21 in place also. A wheel 23 is keyed to the projecting end of the axle shaft in a well-known manner, and is provided with a suitable brake flange 24 of the usual construction. A nut 25 retains the wheel on the axle shaft and a hub cap 26 forms an ornamental covering for the nut.

At the middle portion of the axle is a transversely extending driving shaft 27, this shaft as shown, being arranged laterally between the adjacent ends of the axle shafts 21. The shaft 27 passes through a forwardly projecting part 28 of the cover 18, and has a bearing 29 in said part 28. On the other side of the axle shaft 21, the shaft 27 has a bearing 30 mounted in an arm 31 which extends from and is detachably secured to the cover 18, as shown particularly in Fig. 2. The main part of this arm or bracket 31 is secured to the cover 18 by the bolts 32, and there are two brace arms 33 arranged at right angles to the main arm 31 and secured to the cover 18 as by the bolt 34. It will be seen that the main arm 31 extends substantially in a horizontal plane or in line with the axle shafts 21, whereas the arms 33 are arranged substantially in a vertical plane, or generally in line with the transverse shaft 27. Thus, the bearing 30 is very substantially braced in its position.

Mounted upon the driving shaft 27 is a differential gearing 35, comprising compensating pinions 36 mounted on pins 37, the axes of which are arranged radially of the driving shaft 27 and rotate in a plane passing through the axes of the axle shafts 21. Each of the driven gears 38 of the differential gearing is formed with a sleeve 39, which surrounds and has a bearing upon a portion of the driving shaft 27. The remote ends of the sleeves 39 are formed with bevel driving pinions 40, which pinions are adapted to mesh with large driven gears 41 and 42. For the purpose of properly nesting the gears as shown, the gear 41 is made slightly larger than the gear 42, but the ratio between the gear 41 and its pinion 40 is of course the same as the ratio between the gear 42 and its pinion.

Each of the gears 41, 42, is revolubly mounted in a pair of separated annular bearings 43 and 44. As shown, the inner bearing 43 is mounted inwardly of the web of the gear, and the outer bearing 44 is mounted on the other side of said web. Thus, the gears are very firmly supported and are adapted to take the end thrust as well as the radial load applied to them. Thrust bearings 45 may be provided adjacent the bearings 44, as shown, for the purpose of assisting the radial bearings in taking the thrust loads. Thrust bearings 46, 47 are also provided in the bracket 31 and the extension 28 respectively, for the purpose of taking the end thrust of the pinions 40.

It will be understood that semi-cylindrical seats are formed in the cover 18 for each of the bearings 43, 44 and 45, and the various bearings are held in their respective seats by suitable detachable caps or brackets. The right hand bearings 44 and 45 are retained in their seats by the bracket 31, the part 48 of said bracket forming a cap for this purpose. The left hand bearings 44 and 45 are retained by a cap 49, secured in place by bolts 50. 51 represents the integral part of the cover 18 which forms the seats for the two inner bearings 43, and detachable caps 52 secure these bearings in place, and are themselves held by bolts 53. The parts 51 are slightly cut away as shown at 54, in Figs. 1 and 3, to permit the pinion 40 to be inserted between them. It is unnecessary to cut away the caps 52 because they are not in place when the pinion 40 is inserted.

By reason of the comparatively wide separation of the bearings 43, 44, the gears 41 and 42 are each formed with a hub 55, the extreme ends of which are supported by said bearings 43, 44. The axle shafts 21 have a withdrawable driving connection with these hubs 55, and as shown, the hubs are interiorly squared and the inner ends of the axle shafts 21 are similarly squared so that they may be easily inserted in the hubs and withdrawn therefrom.

It will be understood that the interior of the axle is readily accessible by removing the cover 17. Also, that the front cover 18 many be removed with all of the gearing intact after the axle shafts 21 have been withdrawn sufficiently to break the driving connection between their inner ends and the gear hubs 55.

Referring to the second form of the invention shown in Figs. 5, 6, and 7, it will be seen that the tubular portions 11 of the axle casing are slightly offset relatively to each other, and the axle shafts 21 are mounted in the tubular portions in the same offset relation. This necessitates the middle portion 12$^a$ of the axle being slightly different in form to take care of the offset arrangement of the tubular portions, but otherwise the supporting structure is the same as that shown in the other figures.

Also the covers 17 and 18$^a$ are substantially the same as those shown in the other figures, the only differences being in the slightly altered arrangement for supporting the bearings.

In this form of the invention, it will be seen that the gears 41 and 42$^a$ are of the same size, and consequently the pinions 40$^a$ which mesh with them are each the same size. Interference of the pinions and gears is obviated in this construction by the offset arrangement of the axle shafts 21 and consequently of the axes of the gears 41$^a$ and 42$^a$. Combination radial and thrust bearings 44$^a$ are provided for the outer ends of the hubs 55 of these gears. The radial bearings 43$^a$ are arranged immediately outside of the webs of the gears, instead of inside as shown in the other figures. They are still widely separated, however, from the bearings 44$^a$.

In this form of the invention also, the pinions 40$^a$ and the gears 41$^a$, 42$^a$, with which they respectively mesh, are formed with tangentially arranged teeth, as shown particularly in Figs. 6 and 7, and the angle of the teeth and the relative sizes of the pinions and gears is such that there is a tendency in the forward drive of the axle, for the pinions to draw inwardly toward the apexes of the cones instead of outwardly as is the case with the ordinary radial toothed gears. Thus in Fig. 7 it will be seen that, in the normal forward drive of the axle with equal resistance to both wheels, the driving shaft 27 and consequently both of the sleeves 39ª and pinions 40ª will rotate in the direction of the arrows 60. Hence the tooth 61 of the forward pinion 40ª will be driving tooth 62 of gear 41ª in the direction of the arrow 63 and the wedging action due to the tangential form of the tooth will tend to draw the pinion inwardly. Likewise the tooth 64 of the rear pinion 40ª will be driving tooth 65 of gear 42ª in the direction of the arrow 66 and the wedging action will tend to draw the pinion inwardly.

These inward tendencies of the pinions will of course be resisted by the outward thrust of the respective bevel gears 38 on the inner ends of the sleeves 39ª, so that as shown the thrusts are approximately balanced and very little end thrust either way is the result. What slight end thrusts exist in either direction in normal operation, or what thrusts may be present in abnormal operation of the axle, are taken by shoulders 67 on the shaft 27 at the inner ends of the sleeves 39ª, and rings 68 and 69 secured to the shaft 27 at the outer ends of said sleeves. Thus all of the end thrusts are self contained and balanced in the shaft 27 and it is necessary to mount said shaft practically for radial load only. The thrust load on the shaft bearings is only what is required to position the shaft. As shown the bearing 29ª at the front end of the shaft 27 is secured thereon between the ring 68 and a member 70 held on the end of the shaft by a nut 71, and it may slide endwise in the cap 72 in the front end of the cover 18ª. At the rear end of the shaft the bearing 30ª is secured between a shoulder 73 and a bolt 74 threaded into the end of the shaft, and its outer race is secured between shoulders 75 of a bracket 31ª. This bearing it will be seen is a combination radial and thrust bearing and it thus positions the shaft 27 in the axle structure. Shims may be used if desired between the shoulder 73 and the inner race of this bearing 30ª to adjust the shaft 27 lengthwise.

The member 31ª of the axle structure is in the form of a two armed separable bracket, being divided along a line 31ᵇ and connected by bolts 31ᶜ, as shown particularly in Figs. 6 and 7. One of the arms 33ª of this bracket 31ª is detachably bolted to the cover 18ª forming a cap 48ª for securing the right hand bearings 43ª and 44ª in position in their respective seats in the cover 18ª. The other arm 33ᵇ of the bracket 31ª is likewise bolted to the cover 18ª and forms a cap 49ª for the left hand bearings 43ª and 44ª.

It will be understood that there is the same withdrawable connection between the inner ends of the driving shafts 21 and the hubs 55 of the bevel gears.

While several forms of the invention have been shown and described, it will be understood that these are not all of the forms the invention may take, as it will be apparent that other changes may be made without departing from the spirit or scope of the invention as set forth in the annexed claims.

Having thus described my invention, what I claim and desire to secure by Letters Patent is:—

1. In an axle, in combination, a tubular supporting structure having an enlarged middle portion and a lateral opening in said portion, a cover for said opening, axle shafts within said tubular structure, a bevel gear having a driving connection with the inner end of each of said axle shafts and mounted in bearings directly supported by said cover, differential driving mechanism connected to drive said bevel gears and supported by said cover, and means for driving said mechanism.

2. In an axle, in combination, a tubular supporting structure having an enlarged middle portion and a lateral opening in said portion, a cover for said opening, axle shafts within said tubular structure, a bevel gear having a driving connection with the inner end of each of said axle shafts and mounted in bearings directly supported by said cover, bevel pinions in mesh with said gears, differential mechanism for driving said pinions, and means for driving said mechanism.

3. In an axle, in combination, a tubular supporting structure having an enlarged middle portion and a lateral opening in said portion, a cover for said opening, axle shafts within said tubular structure, a bevel gear having a driving connection with the inner end of each of said axle shafts and mounted in bearings directly supported by said cover, bevel pinions in mesh with said gears, differential mechanism for driving said pinions, and a driving shaft extending through said differential mechanism and supported in bearings in said cover.

4. In an axle, in combination, a tubular supporting structure having an enlarged middle portion and a lateral opening in said portion, axle shafts within said tubular structure, a bevel gear at the inner end of each of said axle shafts with which said shafts have an axially withdrawable driving connection, means for wholly supporting said gears at the middle portion of said structure, a laterally extending driving shaft having differential gearing, and pinions in mesh with said bevel gears and operated by said differential gearing.

5. In an axle, in combination, a tubular supporting structure having an enlarged middle portion, axle shafts within said tubular structure, oppositely facing bevel gears upon the adjacent inner ends of said shafts, bearings for said gears in the middle portion of said structure, pinions in mesh with said gears, laterally arranged differential gearing for driving said pinions, and a driving connection between said gears and their respective axle shafts such that all the radial and thrust loads on the gears are taken by said bearings.

6. In an axle, in combination, a tubular supporting structure having an enlarged middle portion, axle shafts within said tubular structure, oppositely facing bevel gears upon the adjacent inner ends of said shafts, bearings for said gears in the middle portion of said structure, pinions in mesh with said gears, laterally arranged differential gearing for driving said pinions, and a driving connection between said gears and their respective axle shafts such that all the radial and thrust loads on the gears are taken by said bearings, said connection permitting axial withdrawal of said axle shafts.

7. In an axle, in combination, a tubular supporting structure having an enlarged middle portion and a lateral opening in said portion, a cover for said opening, axle shafts within said tubular structure, a driving shaft extending laterally of said axle shafts and supported in bearings by said cover, differential gearing on said driving shaft, and means forming a driving connection from said differential gearing to said axle shafts.

8. In an axle, in combination, a tubular supporting structure having an enlarged middle portion and a lateral opening in said portion, a cover for said opening, axle shafts within said tubular structure, a driving shaft extending laterally of said axle shafts and supported in bearings by said cover, differential gearing on said driving shaft, bevel pinions driven by said differential gearing, and bevel gears at the inner ends of said axle shafts driven by said pinions.

9. In an axle, in combination, a tubular supporting structure having an enlarged middle portion and a lateral opening in said portion, a cover for said opening, axle shafts within said tubular structure, bevel gears at the inner ends of said axle shafts, bevel pinions for driving said gears and supported by said cover, differential gearing operatively connected to said bevel pinions, and means for driving said differential gearing.

10. In an axle, in combination, a tubular supporting structure having an enlarged middle portion and a lateral opening in said portion, a cover for said opening, axle shafts within said tubular structure, bevel gears at the inner ends of said axle shafts, bevel pinions for driving said gears and supported by said cover, differential gearing operatively connected to said bevel pinions, and a driving shaft also supported by said cover and arranged to drive said differential gearing.

11. In an axle, in combination, a tubular supporting structure having an enlarged middle portion, laterally arranged differential driving gearing, pinions operated by said gearing, bevel gears in mesh with said pinions, all said gearing, pinions and gears being supported in operative relation in bearings in the middle portion of said structure, axle shafts having their inner ends supported by said bevel gears, bearings at the outer ends of said structure for supporting said axle shafts, and wheels secured to and driven by said axle shafts.

12. In an axle, in combination, a tubular supporting structure having an enlarged middle portion and a lateral opening in said portion, a cover for said opening, a laterally arranged differential gearing supported by said cover, gears driven by said gearing, and axle shafts connected to said gears.

13. In an axle, in combination, a tubular supporting structure having an enlarged middle portion and a lateral opening in said portion, a cover for said opening, a laterally arranged differential gearing supported by said cover, gears driven by said gearing, and axle shafts detachably connected to and driven by said gears.

14. In an axle, in combination, a tubular supporting structure having an enlarged middle portion and a lateral opening in said portion, a cover for said opening, a laterally arranged differential gearing supported by said cover, gears driven by said gearing, and axle shafts having bearings at the outer ends of said structure and detachably connected to and driven by said gears.

15. In an axle, in combination, a tubular supporting structure having an enlarged middle portion and a lateral opening in said portion, a cover for said opening, a pair of oppositely facing bevel gears mounted in bearings directly in said cover, driving means for said gears, and axle shafts within said structure connected to said gears.

16. In an axle, in combination, a tubular supporting structure having an enlarged middle portion and a lateral opening in said portion, a cover for said opening, a pair of oppositely facing bevel gears independently mounted in bearings directly in said cover, driving means for said gears and axle shafts within said structure connected to said gears.

17. In an axle, in combination, a tubular supporting structure having an enlarged middle portion and a lateral opening in said portion, a cover for said opening, a pair of oppositely facing bevel gears independently mounted in separated bearings directly in said cover, driving means for said gears, and axle shafts connected to said gears.

18. In an axle, in combination, a tubular supporting structure having an enlarged middle portion and a lateral opening in said portion, a cover for said opening, a laterally arranged differential gearing supported by said cover, gears driven by said gearing and independently supported in bearings by said cover, and axle shafts detachably connected to said gears.

19. In an axle, in combination, a tubular supporting structure having an enlarged middle portion and a lateral opening in said portion, a cover for said opening, a laterally arranged differential gearing supported by said cover, bevel pinions operated by said gearing, bevel gears in mesh with said pinions on either side of said gearing, bearings for said bevel gears directly in said cover, and axle shafts connected to said bevel gears to be driven thereby.

20. In an axle, in combination, a tubular supporting structure having an enlarged middle portion and a lateral opening in said portion, a cover for said opening, axle shafts within said structure, a driving shaft laterally arranged and extending through said cover and between the adjacent ends of said axle shafts to a point beyond said shafts, gearing conecting said shafts, and bearings for said driving shaft supported by said cover.

21. In an axle, in combination, a tubular supporting structure having an enlarged middle portion and a lateral opening in said portion, a cover for said opening, axle shafts within said structure, a driving shaft laterally arranged and extending through said cover and between the adjacent ends of said axle shafts to a point beyond said shafts, gearing connecting said shafts, and bearings for said driving shaft at both sides of said axle shafts and supported by said cover.

22. In an axle, in combination, a tubular supporting structure having an enlarged middle portion and a lateral opening in said portion, a cover for said opening, axle shafts within said structure, a driving shaft laterally arranged and extending through said cover and between the adjacent ends of said axle shafts to a point beyond said shafts, gearing connecting said shafts, a bearing for said driving shaft where it passes through said cover, and said cover having an arm extending beyond said axle shafts and supporting a bearing for the extended end of said driving shaft.

23. In an axle, in combination, a tubular supporting structure having an enlarged middle portion and a lateral opening in said portion, a cover for said opening, axle shafts within said structure, a driving shaft laterally arranged and extending through said cover and between the adjacent ends of said axle shafts to a point beyond said shafts, gearing connecting said shafts, a bearing for said driving shaft where it passes through said cover, and said cover having a detachable arm extending beyond said axle shafts and supporting a bearing for the extended end of said driving shaft.

24. In an axle, in combination, a supporting casing having a lateral opening, a cover for said opening, axle shafts, a transverse driving shaft, a bearing supporting the inner end of one of said axle shafts, bearings for the driving shaft on both sides of the axle shafts, a bracket detachably connected to the cover, all of said bearings being supported in the cover and bracket, and gearing connecting said shafts.

25. In an axle, in combination, a supporting casing having a lateral opening, a cover for said opening, axle shafts, a transverse driving shaft, a bearing supporting the inner end of one of said axle shafts, bearings for the driving shaft on both sides of the axle shaft, a bracket detachably connected to the cover and supporting one of said driving shaft bearings, the other of said driving shaft bearings and the axle shaft bearing being supported in the cover, and gearing connecting said shafts.

26. In an axle, in combination, a supporting casing having a lateral opening, a cover for said opening, axle shafts, a transverse driving shaft, separated bearings for the driving shaft one on either side of the axle shafts, differential gearing on said driving shaft between said bearings, means for supporting said bearings in said cover, and gears connecting said differential gearing and said axle shafts.

27. In an axle, in combination, a supporting casing, oppositely facing bevel gears at the middle of said casing, separated bearings for each of said gears, axle shafts detachably connected to said gears, and differential gearing mounted transversely between and connected to drive said gears.

28. In an axle, in combination, a supporting casing, oppositely facing bevel gears at the middle of said casing, separated bearings for each of said gears, the two bearings for each gear being arranged on either side of the respective gear, axle shafts driven by said gears, and differential gearing mounted transversely between and connected to drive said gears.

29. In an axle, in combination, a supporting casing, oppositely facing bevel gears at the middle of said casing, separated bearings for each of said gears, the two bearings for each gear being arranged on either side of the respective gear, axle shafts driven by said gears, a driving shaft arranged between the two middle adjacent bearings, differential gearing on said shaft and arranged between said gears, and pinions driven by said gearing and meshing with said bevel gears.

30. In an axle, in combination, a supporting casing, axle shafts therein, a transverse driving shaft extending between the adjacent ends of said axle shafts, a bearing supporting member secured to the casing, bearings for said driving shaft on both sides of the axle shafts, one of said bearings being mounted directly in said member, a bracket supporting the other of said bearings, said bracket having three arms each detachably connected to said member, and gearing connecting said shafts.

31. In an axle, in combination, a supporting casing, axle shafts therein, a transverse driving shaft extending between the adjacent ends of said axle shafts, a bearing supporting member secured to the casing, bearings for said driving shaft on both sides of the axle shafts, one of said bearings being mounted directly in said member, a bracket supporting the other of said bearings, said bracket having three arms each detachably connected to said member, one of said arms being arranged generally in the plane of said axle shafts and the other arms at right angles thereto, and gearing connecting said shafts.

32. In an axle, in combination, a supporting casing, axle shafts therein, a transverse driving shaft extending between the adjacent ends of said axle shafts, a bearing supporting member secured to the casing, bearings for said driving shaft on both sides of the axle shafts, one of said bearings being mounted directly in said member, a bracket supporting the other of said bearings, said bracket having three arms each detachably connected to said member, one of said arms being arranged horizontally and the others in a substantially vertical plane, and gearing connecting said shafts.

33. In an axle, in combination, a supporting structure, axle shafts therein, a driving shaft extending transversely between the adjacent ends of said axle shafts, bearings supporting the inner ends of said axle shafts, bearings for the driving shaft on both sides of the axle shafts, a two-part bracket divided at and supporting one of the driving shaft bearings, said bracket assisting in supporting said first mentioned bearings, and gearing connecting said shafts.

34. In an axle, in combination, a supporting structure, axle shafts therein, a driving shaft extending transversely between the adjacent ends of said axle shafts, bearings supporting the inner ends of said axle shafts, bearings for the driving shaft on both sides of the axle shafts, a bracket supporting one of said driving shaft bearings, said bracket assisting in supporting one of said first mentioned bearings, and gearing connecting said shafts.

35. In an axle, in combination, a supporting casing, axle shafts therein arranged with their axes parallel and offset, bevel gears independently supported at the middle of said casing, a detachable driving connection between said axle shafts and the respective gears, a laterally extending driving shaft, and gearing connecting said shafts.

36. In an axle, in combination, a supporting casing, axle shafts therein arranged with their axes parallel and offset, bevel gears independently supported at the middle of said casing, a detachable driving connection between said axle shafts and the respective gears, a laterally extending driving shaft, bearings for said gears and for said driving shaft, a bearing supporting member in which said bearings are mounted, and gearing connecting said shafts.

37. In an axle, in combination, a tubular supporting structure having an enlarged middle portion and a lateral opening in said portion, a cover for said opening, axle shafts within said structure arranged with their axes parallel and offset, a transverse driving shaft, gearing connecting said shafts, bearings supporting the inner ends of the axle shafts and bearings supporting the driving shaft, all of said bearings being supported in said cover.

38. In an axle, in combination, a tubular supporting structure having an enlarged middle portion and a lateral opening in said portion, a cover for said opening, axle shafts within said structure arranged with their axes parallel and offset, a transverse driving shaft, two oppositely facing bevel gears of the same size mounted at the middle portion of said structure in bearings supported by said cover, said gears connected to drive said axle shafts respectively, differential gearing on said driving shaft, and bevel pinions meshing with said gears and operated by said gearing.

39. In an axle, in combination, a supporting casing, axle shafts therein, a transverse driving shaft, bevel gears at the inner ends of said axle shafts, a pair of separated bearings at one side of each of said gears for supporting said gears, and pinions operated by said driving shaft and meshing with said gears.

40. In an axle, in combination, a supporting casing, axle shafts therein, a transverse driving shaft, bevel gears at the inner ends of said axle shafts, a pair of separated bearings at one side of each of said gears for supporting said gears, differential gearing on said driving shaft between said gears, and pinions operated by said gearing and meshing with said bevel gears.

41. The combination with oppositely facing bevel gears, of a lateral driving shaft arranged between said gears, a differential mechanism on said shaft comprising oppositely facing bevel gears and a balance bevel gear between them causing outward thrust on both of the bevel gears of the differential mechanism, and bevel driving pinions on said driving shaft in mesh respectively with the first mentioned bevel gears and connected respectively to the oppositely facing bevel gears of the differential mechanism, said pinions and the gears with which they mesh having tangentially arranged teeth, whereby, in one direction of rotation of the driving shaft, the outward thrust of said differential gears is met by a tendency of said pinions toward inward thrust.

42. The combination with a driving shaft, and a driven shaft in the same plane and normal thereto, of a bevel pinion on the driving shaft, a bevel gear on the driven shaft larger than the pinion and in mesh therewith, said gear and pinion having tangentially arranged teeth, and differential gearing on said driving shaft and connected to said pinion.

43. The combination with a driving shaft and a driven shaft in the same plane and normal thereto, of a bevel pinion on the driving shaft, a bevel gear on the driven shaft larger than the pinion and in mesh therewith, said gear and pinion having tangentially arranged teeth, and a second bevel gear on said driving shaft between said pinion and said driven shaft.

44. The combination with a driving shaft, and a driven shaft in the same plane and normal thereto, of a bevel pinion on the driving shaft, a bevel gear on the driven shaft larger than the pinion and in mesh therewith, said gear and pinion having tangentially arranged teeth, and a second bevel gear on said driving shaft facing the same way as said pinion.

45. The combination with a driving shaft, and a driven shaft in the same plane and normal thereto, of a bevel pinion on the driving shaft, a bevel gear on the driven shaft larger than the pinion and in mesh therewith said gear and pinion having tangentially arranged teeth, and a second bevel gear on said driving shaft facing the same way as said pinion, said second gear having radially arranged teeth.

46. The combination with a driving shaft, and a driven shaft in the same plane and normal thereto, of a bevel pinion on the driving shaft, a bevel gear on the driven shaft in mesh with said pinion, said pinion and gear being of such relative sizes and having teeth tangentially arranged at such an angle, as to cause axial thrust of the pinion toward the apex of the cone, and a second bevel gear on said driving shaft between said pinion and said driven shaft.

47. The combination with a driving shaft, and a driven shaft in the same plane and normal thereto, of a bevel pinion on the driving shaft, a bevel gear on the driven shaft in mesh with said pinion, said pinion and gear being of such relative sizes and having teeth tangentially arranged at such an angle, as to cause axial thrust of the pinion toward the apex of the cone, and a second bevel gear on said driving shaft facing the same way as said pinion.

48. The combination with a driving shaft, and a driven shaft in the same plane and normal thereto, of a bevel pinion on the driving shaft, a bevel gear on the driven shaft in mesh with said pinion, said pinion and gear being of such relative sizes and having teeth tangentially arranged at such an angle, as to cause axial thrust of the pinion toward the apex of the cone, and a bevel gear differential mechanism on said driving shaft and connected to said pinion.

49. In an axle, in combination, a supporting structure wheels at the ends thereof, axle shafts connected to said wheels, oppositely facing bevel gears at the inner ends of said shafts a driving shaft extending laterally between the inner ends of said shafts, and bevel driving pinions on said driving shaft in mesh respectively with the bevel gears, said pinions and gears having tangentially arranged teeth.

50. In an axle, in combination, a supporting structure, wheels at the ends thereof, axle shafts connected to said wheels, oppositely facing bevel gears at the inner ends of said shafts, a driving shaft extending laterally between the inner ends of said shafts, bevel driving pinions on said driving shaft in mesh respectively with the bevel gears, said pinions and gears having tangentially arranged teeth, and a bevel gear differential mechanism on said driving shaft arranged between and connected to drive said pinions.

51. In an axle, in combination, a supporting structure, oppositely facing bevel gears therein, a lateral driving shaft arranged between said gears, driving bevel pinions on said shaft in mesh respectively with said gears, said pinions and gears having tangentially arranged teeth and separated bearings in said structure supporting said driving shaft, one only of said bearings being adapted to take end thrust.

52. In an axle, in combination, a supporting structure, oppositely facing bevel gears therein, a lateral driving shaft arranged between said gears, driving bevel pinions on said shaft in mesh respectively with said gears, said pinions and gears having tangentially arranged teeth and separated bearings in said structure supporting said driving shaft, one only of said bearings being secured in said structure against endwise movement.

53. In an axle, in combination, a supporting structure, oppositely facing bevel gears therein, a lateral driving shaft arranged between said gears, driving bevel pinions on said shaft in mesh respectively with said gears, said pinions and gears having tangentially arranged teeth and separated bearings in said structure supporting said driving shaft, one of said bearings being adapted to take end thrust and the other being floating and taking radial load only.

54. In an axle, in combination, a supporting structure, oppositely facing bevel gears therein, a lateral driving shaft arranged between said gears, a differential mechanism on said shaft comprising compensating pinions and driven bevel gears, driving bevel pinions on said shaft operated respectively by the bevel gears of said compensating mechanism and arranged in mesh respectively with said oppositely facing bevel gears, said pinions and gears having tangentially arranged teeth, thrust means on said shaft to take the thrust of said driving bevel pinions, and separated bearings in said structure supporting said driving shaft, one only of said bearings being adapted to take end thrust.

55. In an axle, in combination, a supporting structure, oppositely facing bevel gears therein, a lateral driving shaft arranged between said gears, a differential mechanism on said shaft comprising compensating pinions and driven bevel gears, driving bevel pinions on said shaft operated respectively by the bevel gears of said compensating mechanism and arranged in mesh respectively with said oppositely facing bevel gears, said driving bevel pinions and the bevel gears with which they mesh having tangentially arranged teeth, thrust means on said shaft to take thrust of said driving bevel pinions in both directions, and supporting bearings for said driving shaft in said structure.

56. In an axle, in combination, a supporting structure, oppositely facing bevel gears therein, a lateral driving shaft arranged between said gears, a differential mechanism on said shaft comprising compensating pinions and driven bevel gears, driving bevel pinions on said shaft operated respectively by the bevel gears of said compensating mechanism and arranged in mesh respectively with said oppositely facing bevel gears, said driving bevel pinions and the bevel gears with which they mesh having tangentially arranged teeth, thrust means on said shaft to take thrust of said driving bevel pinions in both directions, and separated bearings in said structure, supporting said driving shaft, one only of said bearings being adapted to take end thrust.

In testimony whereof I affix my signature.

ORMOND E. HUNT.